United States Patent
Pagan

(10) Patent No.: US 7,542,026 B2
(45) Date of Patent: Jun. 2, 2009

(54) APPARATUS METHOD AND SYSTEM FOR IMPROVED FEEDBACK OF POINTING DEVICE EVENT PROCESSING

(75) Inventor: William Gabriel Pagan, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 540 days.

(21) Appl. No.: 10/700,069

(22) Filed: Nov. 3, 2003

(65) Prior Publication Data

US 2005/0093817 A1      May 5, 2005

(51) Int. Cl.
G09G 5/00    (2006.01)
G06F 3/00    (2006.01)
G06F 5/00    (2006.01)

(52) U.S. Cl. ............................. 345/156; 710/18; 710/54
(58) Field of Classification Search ......... 345/156–184; 710/1–74
See application file for complete search history.

(56) References Cited

U.S. PATENT DOCUMENTS

| | | | | |
|---|---|---|---|---|
| 5,396,600 A * | 3/1995 | Thompson et al. | ............. | 705/28 |
| 5,408,247 A * | 4/1995 | Enomoto et al. | ............. | 345/100 |
| 5,548,304 A | 8/1996 | Yoshino et al. | ............. | 345/145 |
| 5,576,734 A * | 11/1996 | Daniele et al. | ............... | 345/168 |
| 5,995,102 A | 11/1999 | Rosen et al. | ................ | 345/339 |
| 6,118,449 A | 9/2000 | Rosen et al. | ................ | 345/339 |
| 6,243,071 B1 * | 6/2001 | Shwarts et al. | ............... | 715/823 |
| 6,396,476 B1 * | 5/2002 | Bradski et al. | ............... | 345/157 |
| 6,434,629 B1 * | 8/2002 | Stearns et al. | ............... | 719/320 |
| 7,197,562 B2 * | 3/2007 | Murtha et al. | ............... | 709/224 |
| 2002/0171628 A1 * | 11/2002 | Tani et al. | .................... | 345/156 |
| 2003/0201973 A1 * | 10/2003 | Gould et al. | ................. | 345/156 |
| 2004/0125081 A1 * | 7/2004 | Hayakawa | ................... | 345/156 |
| 2004/0194115 A1 * | 9/2004 | Mogilevsky et al. | ........ | 719/318 |
| 2005/0012714 A1 * | 1/2005 | Russo et al. | ................. | 345/157 |
| 2005/0022211 A1 * | 1/2005 | Veselov et al. | ............... | 719/318 |

FOREIGN PATENT DOCUMENTS

JP     2001075787 A     3/2001

* cited by examiner

*Primary Examiner*—Srilakshmi K Kumar
(74) *Attorney, Agent, or Firm*—Kunzler & McKenzie

(57) ABSTRACT

Events generated by a user of a pointing device are received into an event buffer and eventually removed from the event buffer by a receiving process such as an interface driver associated with an operating system. Information regarding the pointing device events residing within the event buffer is collected and used by a feedback module to improve the computing experience. Feedback regarding the collected information may include visual feedback, audible feedback, tactile feedback, or the like. The present invention improves user interaction with a computing system by providing additional information regarding the status of pointing device events and processes.

20 Claims, 4 Drawing Sheets

APPARATUS METHOD AND SYSTEM FOR IMPROVED FEEDBACK OF POINTING DEVICE EVENT PROCESSING

BACKGROUND OF THE INVENTION

1. Field of the Invention

The present invention relates to control of a computer system. Specifically, the invention relates to apparatus, methods, and systems for improved feedback regarding pointing device events and processes.

2. Description of the Related Art

Computer systems have become increasingly interactive with computer users. The advent of the personal computer provided a dedicated computer, keyboard, and monitor to nearly every computer user. Further developments in operating systems such as graphical user interfaces and multimedia support have resulted in a highly interactive experience for computer users. Pointing devices such as mice, light pens, digitizing tablets, trackballs, touch pads, and touch screens have provided the user with additional control and interactivity. In the future, data gloves and gesture recognition are expected to further improve the ability of the user to point to objects or commands that the user wishes to process.

In addition to the accessibility and control provided by input devices and methods, feedback is a critical element of the modern computing experience. Various modes of feedback such as visual and audio feedback guide the user and improve the efficiency of the computing experience. The rich quality of feedback available with multimedia computing devices and systems has significantly improved the interactivity and usefulness of the computing experience.

In addition to application or task specific information, computers often give feedback regarding the operating state of the computer system. For example, a computer may beep and/or display an error message in response to an error condition. A cursor associated with a mouse or other pointing device may change to the shape of a watch or hourglass to indicate that the computer is busy with an operation, and processing of further input from the pointing device will be delayed until the operation is completed. Warnings may be presented to the user to avoid catastrophic conditions or situations.

Despite the many forms and methods of feedback currently presented to users, methods for providing feedback to users of pointing devices remain woefully inadequate. For example, when a computer is busy processing a particular task, the user is not informed as to whether the computer is ready to accept additional input from the pointing device. For example, a user may click or double-click on a screen element to request that a file be opened, or a program be executed. Often such requests place the computer is in a busy state and block further interaction causing the user to repeat the operation. When the computer comes out of the busy state, the user may have unwittingly entered a number of redundant pointing device events or invoked an undesired task or function.

Referring to FIG. 1, a representative prior art computer system 100, illustrates in further detail the issues related to providing feedback to a user of a pointing device. The prior art computer system 100 includes a computer 110, a pointing device 115, a pointing device interface module 120, an event buffer 125, an application interface module 130, and one or more applications 140. The depicted architecture of the prior art computer system 100 imposes certain limitations on user interactivity using the pointing device 115.

The pointing device 115 facilitates selecting user interface elements and inputting spatial data into the computer 110. The pointing device 115 may generate pointing device events, which are received by the pointing device interface module 120. In the depicted example, the pointing device interface module 120 inserts the pointing device events into the event buffer 125. The pointing device interface module 120 may also provide events from the event buffer 125 to the application interface module 130. In certain embodiments, the pointing device interface module 120 is a device driver that interfaces with the hardware associated with the pointing device 115. In the depicted embodiment, the event buffer 125 is an intrinsic part of the pointing device interface module 120.

The application interface module 130 requests or receives pointing device events from the pointing device interface module 120. The application interface module 130 is typically an operating system process that ensures orderly access to the pointing device and any drivers or modules associated therewith. The application interface module 130 provides pointing device events, or events and information associated therewith, to the applications 140. The applications 140 process the events and information provided by the application interface module 130 and determine what feedback will be provided to the user. Such feedback may involve accessing several layers of software before actual feedback is presented to the user.

Existing approaches to giving feedback to the user are dependent on the long processing chain associated with receiving input events and communicating feedback information. If any process in the chain is inaccessible or inoperable, interactivity with the user is suspended or halted. Suspending or halting interactivity requires the user to speculate as to what is occurring within the computing device or system.

Accordingly, what is needed is an improved approach to giving feedback to users of pointing devices, such that the user is provided with more information regarding pointing device events and processes. Such information would further improve the interaction between the computer and the user.

BRIEF SUMMARY OF THE INVENTION

The present invention has been developed in response to the present state of the art, and in particular, in response to the problems and needs in the art that have not yet been fully solved by currently computing devices and systems. Accordingly, the present invention has been developed to provide an apparatus, method, and system for providing improved interaction to a user of a pointing device that overcome many or all of the above-discussed shortcomings in the art.

In one aspect of the present invention, an apparatus for providing improved interaction to a user of a pointing device includes a pointing device interface module that interfaces with a pointing device, an event buffer that receives pointing device events generated by a user, and a feedback module that provides feedback to the user regarding buffered pointing device events. The feedback module may also receive information and provide feedback to the user regarding pointing device events passed to a receiving process. The receiving process may be an application process or an operating system process.

The feedback provided to the user may occur through a variety of modes including audible feedback, visual feedback, and tactile feedback. Examples of visual feedback include screen flashes, indicator lights, icons, status bars, dialogs, and modified cursors. Examples of audio feedback include beeps, tones, pings, musical chords, sound effects, audio recordings, synthesized speech, and the like. Examples of tactile feedback include device vibrations, movement, resistance to movement, actuation of a surface, and the like.

In another aspect of the invention, a method for providing improved interaction to a user of a pointing device includes receiving pointing device events initiated by a user into a buffer, directing pointing device events from the buffer to a receiving process, and providing feedback regarding buffered pointing device events to the user.

Certain embodiments of the present invention inventory pointing device events in order to collect information useful to the user. For example, the number of buffered events and the type of each buffered event may be assessed and used to provide feedback to the user. The collected information may be presented in various forms and modes of communication. For example, audible feedback, visual feedback, tactile feedback and the like may be used to covey information to the user useful for successful interaction with the computer.

Configuration options may facilitate selection of preferred means or methods of providing feedback to the user. Examples of configuration options include screen flash options, indicator light options, cursor color options, cursor shape options, audible sound options, status display options, icon options, vibration options, and motion options.

The present invention improves user interaction with computing devices and systems. The present invention may be applied to a variety of pointing devices such as mice, pens, digitizing tablets, trackballs, touch pads, touch screens, pointing sticks, data gloves, and gesture recognizers. These and other features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

It will be readily understood that the components of the present invention, as generally described and illustrated in the Figures herein, may be arranged and designed in a wide variety of different configurations. Thus, the following more detailed description of the embodiments of the apparatus, method, and system of the present invention, as represented in FIGS. 1 through 4, is not intended to limit the scope of the invention, as claimed, but is merely representative of selected embodiments of the invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module. Executable code is stored on at least one computer readable storage medium.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment and the described features, structures, or characteristics may be combined in any suitable manner in one or more embodiments.

Figure 1:
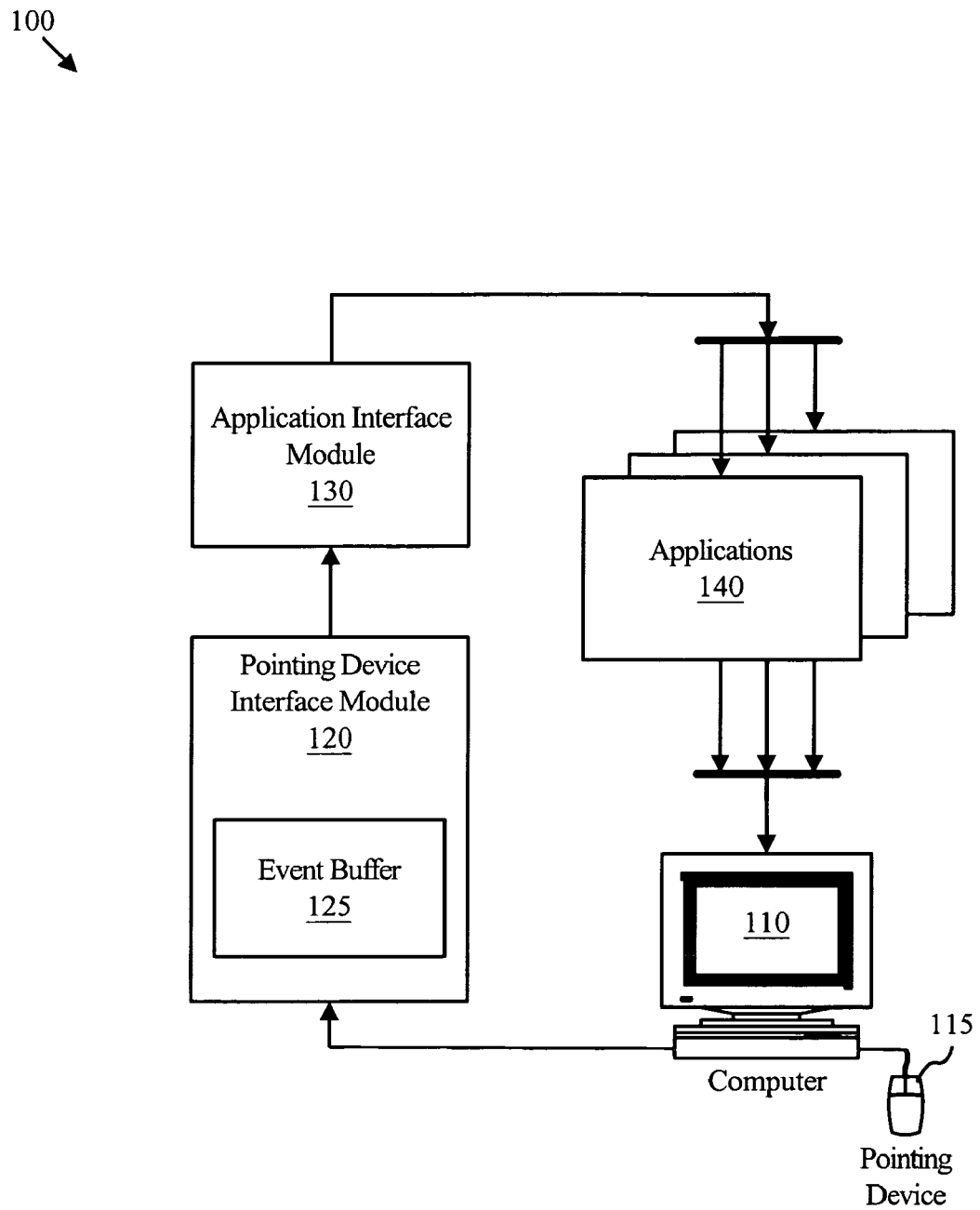
FIG. 1 is a block diagram illustrating a typical prior art computer system.
Figure 2:
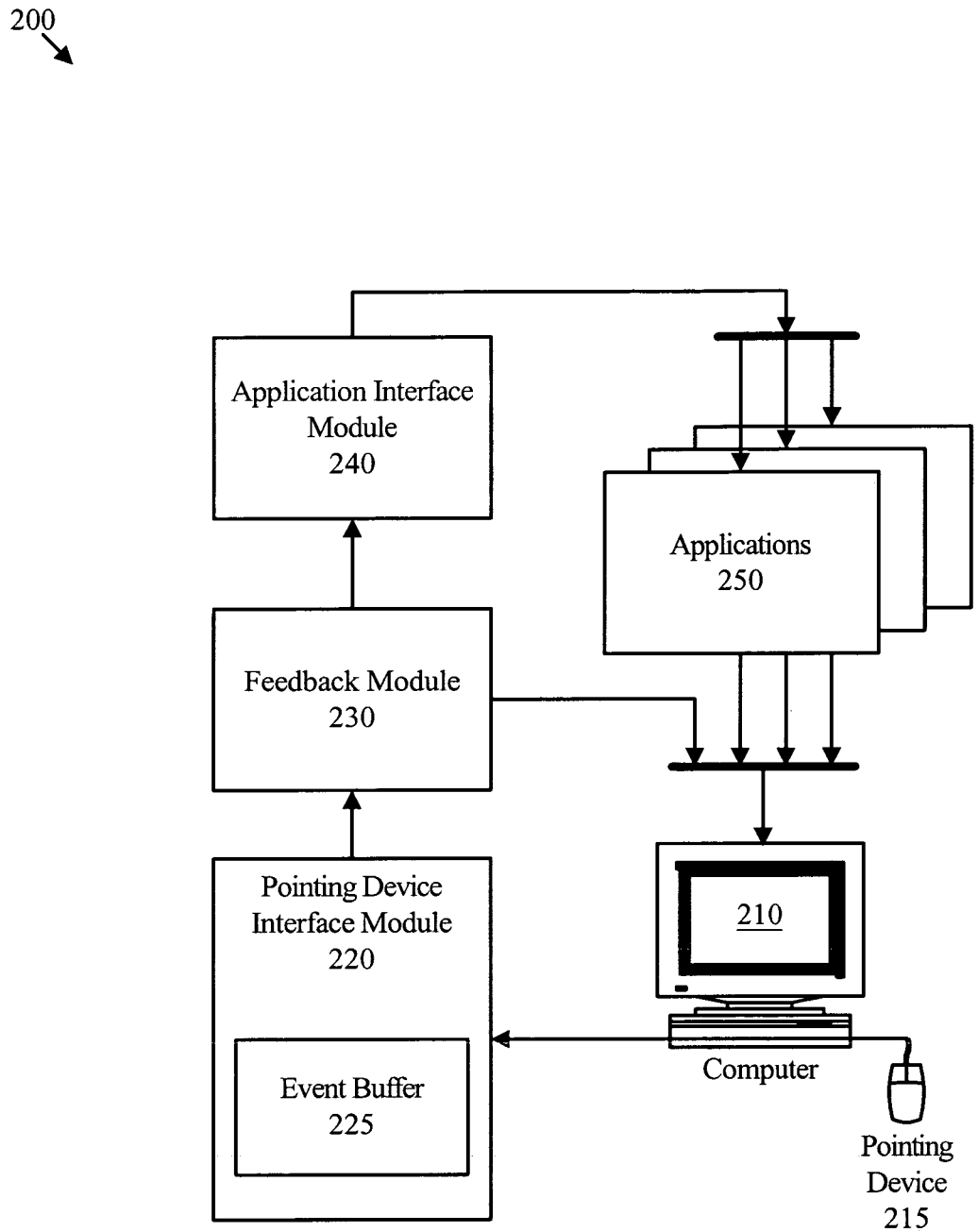
FIG. 2 is a block diagram illustrating a one embodiment of an improved interaction computer system in accordance with the present invention.

FIG. 2 is a block diagram illustrating one embodiment of an improved interaction computer 200 of the present invention. The improved interaction computer 200 includes a computer 210, a pointing device 215, a pointing device interface module 220, an event buffer 225, a feedback module 230, an application interface module 240, and one or more applications 250. The improved interaction computer 200 provides improved interaction to a user of a pointing device, or the like. The improved interaction computing system 200 addresses the previously mentioned limitations of the prior art.

The pointing device 215 facilitates selecting user interface elements and inputting spatial data into the computer 210. Pointing devices may be used with graphical user interfaces to enable the user to control and provide data to the computer. For example, pointing devices may facilitate expression of physical gestures such as "point," "click," and "drag," which result in predictable actions by the computer. Movements of the pointing device may be emulated on the computer screen by a cursor. Representative pointing devices include a mouse, a pen, a digitizing tablet, a trackball, a touch pad, a pointing stick, a data glove, and a gesture recognizer.

The pointing device 215 may generate pointing device events, which are directed to the pointing device interface module 220. In the depicted embodiment, the pointing device interface module 220 buffers pointing device events in the event buffer 225. The pointing device interface module 220 may also provide events from the event buffer 225 to the feedback module 230. In the depicted embodiment, the event buffer 225 is an intrinsic part of the pointing device interface module 220. In other embodiments, the buffer 225 may reside in a location suited to the particular operating system resident on the computer 200.

In one embodiment, the pointing device interface module 220 inventories the number of buffered events and provides the number of events to the feedback module 230. The pointing device interface module 220 may also inventory the type of buffered events and provide the inventory data to the feedback module 230. The pointing device interface module 220 may be a device driver.

The feedback module 230 provides feedback regarding the pointing device events, and may also determine the type of feedback that will be provided to the user, based on the data provided by the pointing device interface module and configuration options which may be set by the user. The feedback module 230 may also coordinate with and provide pointing device events to the application interface module 240, which determines which of the one or more applications 250 the events should be directed to. In one embodiment, the application interface module 240 informs the feedback module when an application process has received a particular pointing device event. The feedback module may use information provided by both the application interface module 240 and the pointing device interface module 220 in order to present a coherent view of pointing device events and processes to the user.

In one embodiment, the feedback module is a device driver filter that resides on the driver level of an operating system. In another embodiment, the feedback module is an operating system process that coordinates with multiple device drivers. In another embodiment, the feedback module is an application process that provides application specific feedback. The depicted embodiment includes the application interface module 240, which may not be present in certain embodiments.

Figure 3:
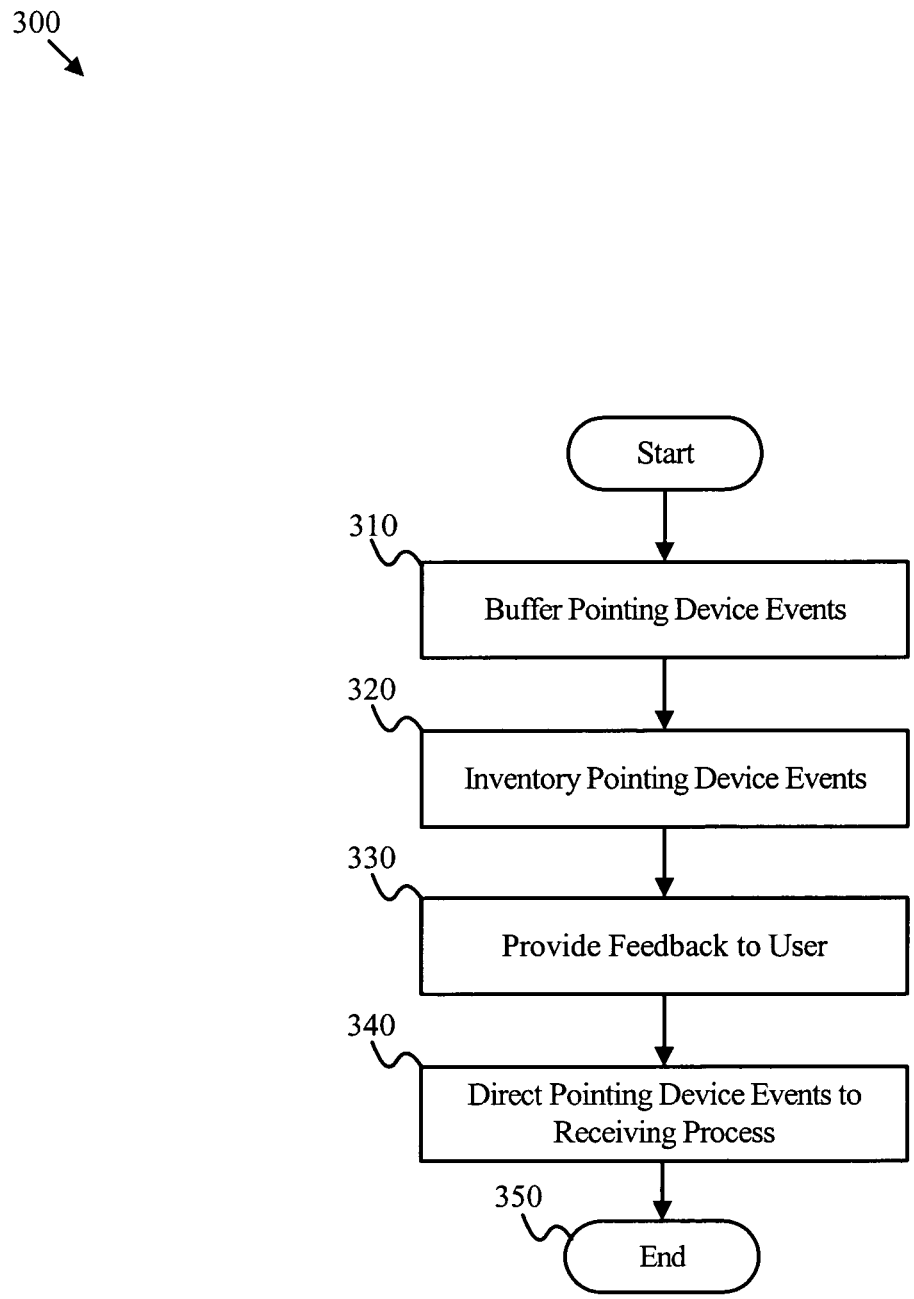
FIG. 3 is a flow chart diagram illustrating one embodiment of a pointing device event feedback method of the present invention.

FIG. 3 is a flow chart diagram illustrating one embodiment of a pointing device event feedback method 300 of the present invention. The pointing device event feedback method 300 includes a buffer events step 310, an inventory events step 320, a provide feedback step 330, and a direct events step 340. The pointing device event feedback method may be conducted in conjunction with, or independent of, the pointing device interface module 220 and the feedback module 230 of FIG. 2. The pointing device event feedback method 300 facilitates improved interaction between the computer and the computer user.

The buffer events step 310 buffers events from the pointing device in an event buffer. In one embodiment, the event buffer is a FIFO queue comprising a circular buffer. The inventory events step 320 inventories pointing device events buffered in the event buffer. In certain embodiments, the inventory consists of a count of the number of events in the event buffer. In some embodiments, the inventory consists of a count of the number of various types of events in the event buffer.

The provide feedback step 330 provides feedback to the user based on the results of the inventory events step 320. Embodiments of the present invention may provide various types of feedback including visual feedback, audible feedback, and tactile feedback. For example, visual feedback may include displaying an icon, status bar, dialog, screen flash, or an indicator light, a modified cursor, or the like. The modified cursor may change in shape, color, texture, or position, or flash to communicate feedback information. Audible feedback may include generating a beep, ping, tone, musical chord, sound effect, or synthesized speech. Tactile feedback may include force, pressure, vibration, and motion. Certain embodiments enable the user to configure the type of feedback to be provided.

The direct events step 340 directs pointing device events to one or more receiving processes. In certain embodiments, the receiving process is an application program process. In other embodiments, the receiving process is an operating system process. Upon completion of the direct events step 340, the pointing device event feedback method ends 350.

Figure 4:
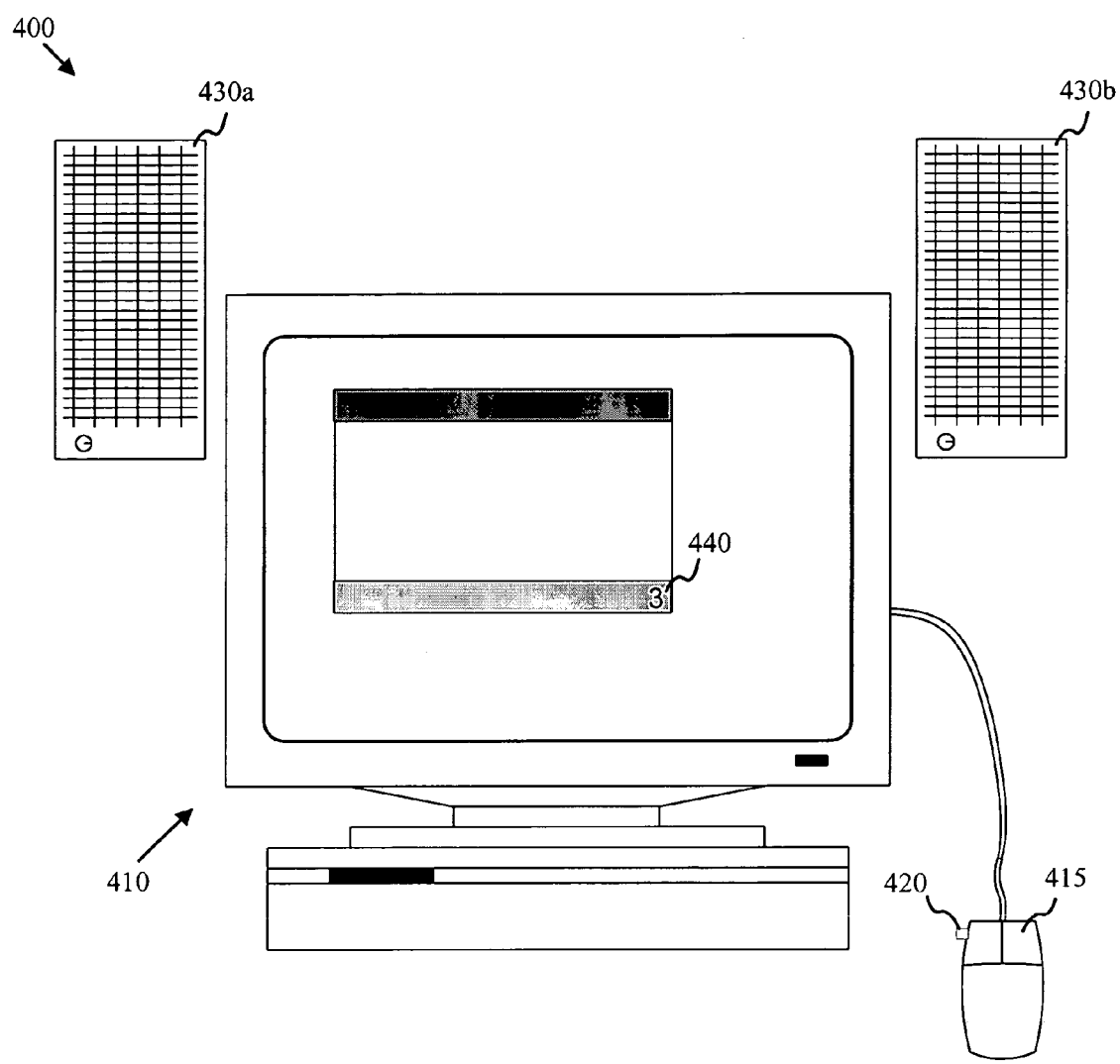
FIG. 4 is a schematic diagram illustrating one embodiment of an improved interaction computer system in accordance with the present invention.

FIG. 4 is a schematic diagram illustrating one embodiment of an improved interaction computer system 400 in accordance with the present invention. The improved interaction computer system 400 comprises a computer 410, a pointing device 415, an indicator light 420, speakers 430a and 430b, and a status bar 440. The depicted embodiment may use the indicator light 420 to provide visual feedback, the speakers 430a and 430b to provide audible feedback, and the status display 440 to provide visual feedback. In one embodiment, the pointing device 415 is enhanced to provide tactile feedback The feedback is in one embodiment generated in accordance with the apparatus and/or method of FIGS. 2 and 3.

The various elements of the present invention facilitate improved interaction with users of computer pointing devices. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for providing improved interaction to a user of a pointing device, the apparatus comprising:
   a pointing device interface module configured to interface with a pointing device;
   an event buffer configured to receive pointing device events generated by a user;
   the pointing device interface module residing at the driver level of an operating system further configured to inventory a buffered pointing device event quantity and a buffered pointing device event type for the buffered pointing device events;
   a feedback module configured to intercept pointing device events sent by the pointing device interface module to an application interface module comprising an operating system process, the feedback module further configured to provide feedback to the user, the feedback comprising a dialog listing the buffered pointing device event quantity and the buffered pointing device event type for the buffered pointing device events and pointing device events passed to a receiving process, wherein the feedback module comprises a device driver residing on the driver level of an operating system;
   wherein the feedback module is further configured to provide pointing device events to the application interface module; and
   wherein the pointing device interface module and the feedback module comprise one or more of hardware and executable code, the executable code stored on a computer readable storage medium.

2. The apparatus of claim 1, wherein the receiving process is an application process.

3. The apparatus of claim 1, wherein the receiving process is an operating system process.

4. The apparatus of claim 1, wherein the feedback further comprises audible feedback.

5. The apparatus of claim 1, wherein the feedback further comprises tactile feedback.

6. The apparatus of claim 1, wherein the pointing device is selected from the group consisting of a mouse, a pen, a digitizing tablet, a trackball, a touch pad, a touch screen, a pointing stick, a data glove, and a gesture recognizer.

7. A method for providing improved interaction to a user of a pointing device, the method comprising:
receiving pointing device events initiated by a user into a buffer;
inventorying a buffered pointing device event quantity and a buffered pointing device event type for the buffered pointing device events;
directing pointing device events from the buffer to a receiving process; and
providing feedback to the user, through a device driver residing on the driver level of an operating system, wherein the feedback is provided without invoking an application interface process of an operating system, the feedback comprising a dialog listing the buffered pointing device event quantity and the buffered pointing device event type for the buffered pointing device events and pointing device events passed to the receiving process.

8. The method of claim 7, wherein the receiving process is an application process.

9. The method of claim 7, wherein the receiving process is an operating system process.

10. The method of claim 7, further comprising inventorying the pointing device events.

11. The method of claim 7, wherein providing feedback further comprises providing audible feedback.

12. The method of claim 7, wherein providing feedback further comprises providing visual feedback.

13. The method of claim 7, wherein providing feedback further comprises providing tactile feedback.

14. The method of claim 7, wherein providing feedback further comprises providing tactile feedback selected from the group consisting of force, pressure, vibration, surface actuation, and motion.

15. The method of claim 7, wherein receiving pointing device events comprises interfacing to a pointing device selected from the group consisting of a mouse, a pen, a digitizing tablet, a trackball, a touch pad, a touch screen, a pointing stick, a data glove, and a gesture recognizer.

16. The method of claim 7, further comprising providing feedback options to a user selected from the group consisting of screen flash options, indicator light options, cursor color options, cursor shape options, audible sound options, icon options, vibration options, and motion options.

17. An apparatus for providing improved interaction to a user of a pointing device, the apparatus comprising:
means for buffering pointing device events initiated by a user;
means for inventorying a buffered pointing device event quantity and a buffered pointing device event type for the buffered pointing device events without invoking one or more application interface operating system processes;
means for directing buffered pointing device events to a receiving process; and
means for providing feedback to the user without invoking one or more application interface operating system processes, the feedback comprising a dialog listing the buffered pointing device event quantity and the buffered pointing device event type for the buffered pointing device events and pointing device events passed to the receiving process;
wherein the means comprise one or more of hardware and executable code, the executable code stored on a computer readable storage medium.

18. A system for providing interaction to a user of a pointing device, the system comprising:
a pointing device;
a CPU configured to execute at least one process;
a monitor configured to display interface elements corresponding to the at least one process;
an event buffer configured to receive pointing device events generated by a user;
a pointing device interface module residing at the driver level of an operating system configured to interface with the pointing device and to inventory a buffered pointing device event quantity and a buffered pointing device event type for the buffered pointing device events; and
a feedback module residing at the driver level of an operating system, configured to provide feedback to the user without invoking an application interface process at the operating system level, the feedback comprising a dialog listing the buffered pointing device event quantity and the buffered pointing device event type for the buffered pointing device events and pointing device events passed to a receiving process.

19. The system of claim 18, wherein the pointing device is selected from the group consisting of a mouse, a pen, a digitizing tablet, a trackball, a touch pad, a touch screen, a pointing stick, a data glove, and a gesture recognizer.

20. A computer readable storage medium comprising computer readable program code for providing improved interaction to a user of a pointing device, the program code configured to conduct a method comprising:
receiving pointing device events initiated by a user into a buffer;
inventorying a buffered pointing device event quantity and a buffered pointing device event type for the buffered pointing device events;
directing pointing device events from the buffer to at least one process; and
providing feedback to the user through a device driver residing on the driver level of an operating system, wherein the feedback is provided without invoking an application interface process of an operating system, the feedback comprising a dialog listing the buffered pointing device event quantity and the buffered pointing device event type for the buffered pointing device events and pointing device events passed to the at least one process.

* * * * *